United States Patent [19]

Eventoff

[11] 4,315,238

[45] Feb. 9, 1982

[54] BOUNCELESS SWITCH APPARATUS

[76] Inventor: Franklin N. Eventoff, 2351 Lake View Ave., Los Angeles, Calif. 90034

[21] Appl. No.: 140,921

[22] Filed: Apr. 16, 1980

Related U.S. Application Data

[63] Continuation-in-part of Ser. No. 78,323, Sep. 24, 1979.

[51] Int. Cl.³ .................. H01C 10/10; H01C 10/12
[52] U.S. Cl. ............................ 338/99; 84/DIG. 7;
       338/69; 338/114; 338/100
[58] Field of Search ............... 338/69, 99, 100, 114;
       200/5 A, 264; 340/365 A; 252/518; 84/DIG. 7

[56] References Cited

U.S. PATENT DOCUMENTS

| | | | |
|---|---|---|---|
| 2,042,606 | 6/1936 | Kotowski | 338/99 X |
| 3,503,031 | 3/1970 | Nyhus et al. | 338/99 |
| 3,806,471 | 4/1974 | Mitchell | 252/518 |
| 4,054,540 | 10/1977 | Michalchik | 338/114 X |
| 4,085,302 | 4/1978 | Zenk et al. | 200/5 A |

Primary Examiner—C. L. Albritton
Attorney, Agent, or Firm—Nilsson, Robbins, Dalgarn, Berliner, Carson & Wurst

[57] ABSTRACT

A pressure responsive, variable resistance, analog switch has first and second conductors interleaved in spaced-apart relationship and disposed on a base member. An insulative spacer ring is positioned around and rises above the first and second conductors. A resilient cover sheet is attached to the top of the insulative spacer ring in spaced relationship over the conductors to define an enclosure between the resilient cover sheet and the base member. A pressure sensitive resistive conductor composition is disposed on the resilient cover sheet or on the conductors in the enclosure to interconnect a resistance between the first and second conductors when the resilient cover sheet is depressed against the conductors. The amount of resistance so interconnected varies inversely to the amount of pressure exerted.

6 Claims, 8 Drawing Figures

BOUNCELESS SWITCH APPARATUS

This is a continuation-in-part application of co-pending application Ser. No. 078,323, filed Sept. 24, 1979, entitled PRESSURE SENSITIVE TRANSDUCER APPARATUS.

BACKGROUND OF THE INVENTION

The present invention relates to pressure sensitive variable resistance devices and in particular relates to pressure sensitive variable resistance switches particularly useful on a keyboard for an electronic musical instrument which actuates the generation or changing of a tone and thereafter causes analog variations in the volume or tonal characteristics in response to the application of a greater or lesser depression of force on the switch.

The generation of musical sounds by electronic means is well known. However, one problem which exists in most electronic instruments is the inability to continuously vary either the volume or the tonal quality of the sound generated. This inability limits the musician's freedom of musical expression. The present invention provides a novel yet simple pressure responsive analog switch having a contact resistance which varies inversely to the amount of pressure applied to depress the analog switch. When used in electronic musical instruments, a plurality of such analog switches may be placed side by side in an elongated fashion to provide a keyboard or one such switch may be used to effect changes in tone by altering the characteristics of one or more tone generating circuits in the musical instrument.

Pressure sensitive analog switches have been known. For example, both in Ruben, U.S. Pat. No. 2,375,178, and Costanzo, U.S. Pat. No. 3,386,067, analog switches are disclosed which sandwich a fibrous or sponge-like layer containing a conductive material between two conductor plates. As the two conductor plates are compressed together the number of electrically conductive paths through the sandwiched layer volume increases, thus decreasing the electrical resistance through that layer. In each of these devices, however, the resistive sandwich layer must be resilient to force the electrodes apart and disconnect most of the conductive paths when the compression force is released. Furthermore, the semiconducting sandwiched layer depends on macroscopic compaction to increase the number of electrical conductive paths between the upper and lower conductor plates. Consequently, the sandwiched layer must have a relatively large thickness. Finally, in such devices the resiliency of the fibrous or sponge-like layer can decrease with use, thus causing a degeneration in the operating characteristics of the switch.

In Mitchell, U.S. Pat. No. 3,806,471, a pressure responsive semiconductor material such as molybdenum disulfide was disclosed, placed between conductor plates to provide an adjustable resistor or transducer. However, Mitchell relies on volume resistance, that is, the resistance through a relatively thick volume of the molybdenum disulfide layer. The present invention on the other hand uses the contact or surface resistance of a very thin layer of molybdenum disulfide. More specifically, Mitchell discloses a molybdenum disulfide volume (thickness) of 0.001 to 1.0 inch using molybdenum disulfide particles in the range of 50 to 600 mesh to provide a high but finite number of three-dimensionally distributed current flow paths through the resistive material. Under compression, the number of current flow paths between the particles in the volume increases, thus causing the resistance to decrease. The semiconductor volume layer is then permanently positioned and attached between two conducting electrodes.

In addition to the above-described functional distinction, the structures disclosed by Mitchell require that the semi-conducting volume be positioned between two electrodes or conductors or otherwise be positioned between a conductor and a nonconductive plate or member so that the semiconducting composition layer does not have any exposed surfaces but rather is in intimate contact with either the insulative plate or the conductors. Such a configuration is fundamentally different from applicant's invention where the semiconducting composition layer must necessarily have at least one contact surface which is not in intimate contact with either a conductor or another semiconducting layer. Such an arrangement facilitates taking advantage of the physical contact resistance over the surface of the composition rather than taking advantage of the surface resistance of the individual particles of material on which Mitchell primarily relies.

The present invention also is exemplified by the use of particle sizes on the order of one micron and layer thickness, preferably less than 0.001 inch. Furthermore, since the variable resistance occurs because of a greater or lesser number of surface contact locations, one surface of the semiconductor layer must be at least initially spaced apart from one of the conducting electrodes or must be in nonintimate contact with the opposing surface, although it may be in touching relationship therewith. Depression of the conducting electrode against the surface of the thin semiconductor layer results in a plurality of contact points being made along the surface. These contact points increase as pressure is applied, thus decreasing the resistance between the conducting plates or contacts on either side of the semiconductor layer. Of course, the surface contact semiconductor layer must be made of any suitable semiconductor material.

A significant advantage of the thin semiconductor layer of the present invention is that the semiconductor material used to form the layer may be combined with a binder and a binder thinner and thereafter sprayed or silk-screened onto the desired surface to form a layer having a thickness as little as one mil or less. Manufacturing costs for both labor and materials are thus greatly decreased.

In addition to the above advantages, the use of molybdenum disulfide to cover the conductive layers effectively protects the surface of the conductor from contact with the air. This alleviates a serious problem which has been attendant with using conductors which slowly corrode when exposed to the air. For example, copper conductors corrode when exposed to the air. This has necessitated the use of expensive silver or other similar and likewise expensive conductive materials. However, when molybdenum disulfide is sprayed or otherwise disposed to cover the conductor, corrosion is greatly reduced which makes possible the use of much less expensive conductor materials such as copper.

Still another significant advantage of the embodiment of the invention where either a conductor and a semiconducting layer surface or two semiconducting layer surfaces are positioned in nonintimate but touching relationship rather than being spaced apart, is that chatter which is inherent in most switches is greatly reduced if not eliminated entirely. Even if the chatter does exist, however, it occurs only when the resistance across the contact of the switch apparatus is so great that the variations in voltage due to the variations in resistance, which cause the chatter will be very small. Consequently, the resultant switch structure in this embodiment is bounceless. Such bounceless switches have significant and substantial commercial applications in the computer industry where there is a constant need for improved bounceless switches of the type disclosed herein. Furthermore, not only is the switch bounceless but it is substantially less expensive than prior bounceless switches.

In Pearlman, et al., U.S. Pat. No. 4,044,642, a touch sensitive resistance device is disclosed for use in musical instruments. However, the device uses a semiconductor material sandwiched between two conductor plates in a manner similar to Ruben and Costanzo. Specifically, Pearlman, et al. uses a resilient material such as foam rubber or foamed synthetic polymeric material which has a particulate material such as graphite dispersed throughout. The switch structure has a foam semiconductor layer and an insulator layer with an orifice therethrough sandwiched between two conductor plates. Thus, when a compression force is applied, the graphite-saturated resilient foam layer deforms into the orifice in the insulator material to initially make electrical contact to thereby switch the musical instrument on. Thereafter, additional compression force causes the resistance between the two conductor plates to decrease in the manner previously described, thereby altering the volume or tonal quality produced.

Because Pearlman, et al. uses a porous foam material there is no problem of air compression in the cavity when the switch is depressed since the air may easily escape and return through the porous resistive material. Furthermore, Pearlman, et al. depends on the physical resiliency of the graphite-impregnated foam material, thus requiring a semiconductor layer of substantially greater thickness than with the present invention. In addition, a degradation in mechanical resiliency of the semiconductor layer also causes a degeneration in switch performance.

It is therefore desirable to provide an analog switch which has a pressure sensitive variable resistance in the ON state but which does not rely upon the resiliency of the semiconductor layer to cause the switch to turn to an OFF state when the compression force is removed. Furthermore, it is desired to provide an analog switch without relying on the volume resistance through a relatively thick semiconductor layer permanently attached between two conductive plates or electrodes.

SUMMARY OF THE INVENTION

The present invention comprises a pressure responsive analog switch having a resistance which varies inversely to the amount of compression force applied to the switch. Specifically, the analog switch has a base member on which first and second spaced contact conductors are disposed. An insulative spacer is positioned on the base member around the contact conductors with a cover fixed to the insulative spacer, spaced above the contact conductors. The space between the cover and the contact conductors defines an enclosure surrounded on its sides by the spacer. The cover is resiliently movable toward the contact conductors in response to an external compression force. A pressure sensitive semiconductor ply is then positioned in the enclosure between the cover and the contact conductors for providing a variable resistance path between the first contact conductor and the second contact conductor when the cover is moved into physical contact with them. The resistance of the pressure sensitive semiconductor ply varies in response to variations in the externally applied compression force. Finally, a passageway is provided between the enclosure and the external region of the analog switch for allowing free airflow into and out of the enclosure when the cover moves away from or towards the contact conductors.

In one embodiment, the pressure sensitive semiconductor ply comprises a thin, pressure sensitive, semiconductor composition layer disposed on the surface of the resiliently movable cover. In a second embodiment, the pressure sensitive semiconductor ply comprises a third conductor, such as a layer of silver, on the surface of the cover in the enclosure and a pressure sensitive semiconductor composition layer disposed on at least one of the first and second contact conductors.

In still another embodiment of the invention, a bounceless switch apparatus is provided having a surface contact resistance which varies inversely with a pressure applied normally thereto. The bounceless switch apparatus includes a first conductor member with a first pressure sensitive composition layer disposed thereon. The first pressure sensitive composition layer includes a particulated semiconducting material disposed for covering the first conductor member in intimate electrically conducting contact therewith and further has a first exposed surface. A second conductor member is then provided in touching but nonintimate relationship to the first exposed surface of the first pressure sensitive composition layer for providing a variable surface contact junction.

In an alternative embodiment the second conductor member may have disposed thereon a second pressure sensitive composition layer likewise including the particulated semiconducting material disposed for covering the second conductor member and for being an intimate electrically conducting contact therewith. The second pressure sensitive composition layer then has a second exposed surface where the first and second exposed surfaces of the first and second pressure sensitive composition layers respectively are positioned in touching but nonintimate relationship with each other for providing a variable surface contact junction.

BRIEF DESCRIPTION OF DRAWINGS

A complete understanding of the present invention and of the above advantages may be gained from a consideration of the following description of the preferred embodiments taken in conjunction with the accompanying drawings in which.

DETAILED DESCRIPTION

Figure 1:
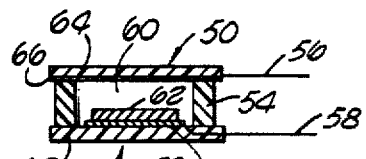
FIG. 1 is a cross-sectional plan view of one embodiment of a pressure responsive analog switch with the pressure responsive coating positioned between two conductor plates in a spaced relationship.

Referring first to FIG. 1, an analog switch in accordance with the present invention is shown comprising a first conductor plate 50 spaced from a second conductor plate 52 by spacers 54 to define a gap or chamber 60 between the first and second conductor plates 50 and 52. At least one of the conductor plates 50 or 52 is resilient so that it may be depressed against the other conductor plate to close the switch.

The conductor plate may comprise a flexible support sheet 64, such as Mylar, with a thin conductive layer 66 of silver or other conductive material sprayed, screened or otherwise applied on the surface of the support sheet 64 adjacent the second conductor plate 52. The second conductor plate 52 may comprise a rigid plastic base member 68 with a thin copper surface 70 disposed thereon. Of course, it will be appreciated that the base member 68 may be flexible and the thin surface 70 may be made of silver or other suitable conductive material. A lead 56 and a lead 58 may be coupled to the silver layer 66 and the copper surface 70 respectively to allow for electrical coupling of the analog switch to a utilization circuit.

Finally, a thin semiconductor layer 62 of semiconductor material is sprayed, screened or otherwise evenly applied on the copper surface 70. Alternatively, the semiconductor material 62 may be sprayed, screened or otherwise evenly applied on the conductive layer 66 or on both the copper surface 70 and the conductive layer 66. The semiconductor material may be any suitable composition which is sprayable, screenable, or otherwise of a consistency which may be evenly applied to form a smooth exposed surface. For example, the semiconductor material may be molybdenum disulfide particulate having particle sizes on the order of one to ten microns mixed with a binder material such as resin to form a liquid. A resin thinner may be added to give the composition a consistency suitable for spraying. The thin semiconductor layer 62 of the semiconductor material is then sprayed or screened on the conductive layer 66 of the support sheet 64 or on the copper surface 70 on the rigid base member 68. It will be appreciated, of course, that the semiconductor layer may be of any thickness so long as there is an exposed smooth semiconductor surface. However, in order to conserve on semiconductor material and to minimize surface irregularities which may occur when thick semiconductor layers are utilized, a thickness on the order of about 0.001 inch or less is preferred.

The use of a very thin layer of sprayed or screened semiconductor material allows the semiconductor material to be resiliently moved by the depression of the conductor plate 50. Furthermore, since it is a surface contact resistance effect and not a volume resistance that causes a decrease in resistance when pressure is applied, much less semiconductor material is required to be used and fabrication of the switch is much faster, easier and less expensive than with prior art devices. The minimum resistance through the semiconductor layer may be selected by control of the ratio of semiconductor material to binder.

Of course, it will be appreciated that the semiconductor material may be brushed or screened or disposed on the selected surface in any suitable way so that a uniform, smooth exposed semiconductor surface is provided. It will also be appreciated that any semiconductor material may be used so long as a large number of contact points are provided on the semiconductor surface whereby variations in the pressure applied to press a second conductor against the semiconductor surface will cause variations in the number of contact points and hence, variations in the resistance across the semiconductor material. The resistance through the semiconductor layer can be varied by varying the semiconductor material to resin ratio. In the preferred embodiment, because the phenomenon is based on surface resistance, not volume resistance, the weight ratio of binder to semiconductor material is about one to one.

Figure 2:
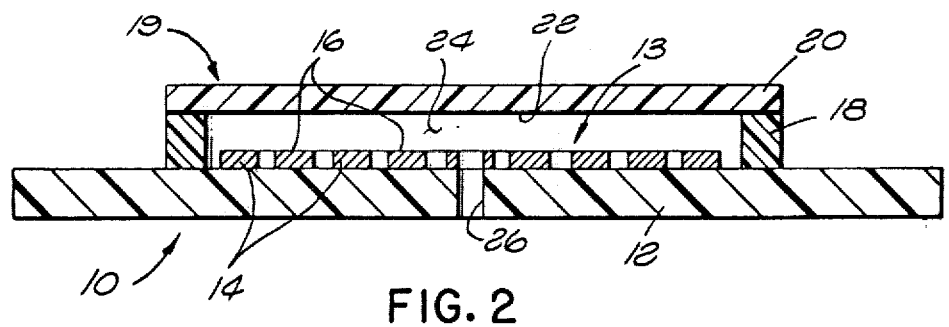
FIG. 2 is a cross-sectional plan view of a preferred embodiment of a pressure responsive analog switch in accordance with the present invention.

Referring to FIG. 2, another embodiment of a pressure responsive, variable contact resistance analog switch 10 is illustrated having a base member 12 which may be rigid plastic, flexible Mylar (polyethylene terephthalate) or any other suitable material. Contact conductors 13 comprising spaced first and second contact conductors 14 and 16 are disposed on one surface of the base member 12. An insulative spacer member 18 is affixed to the base member 12 around the contact conductors 13. A cover 19 is then positioned on top of the insulative spacer 18 thereby defining an enclosure or chamber 24 between the cover 19 and the contact conductors 13.

In one embodiment, the cover 19 comprises a flexible support member 20 which may, for example, be a thin sheet of Mylar. The side of the flexible support member 20 facing the contact conductors 13 is sprayed with a pressure sensitive semiconductor composition layer 22 which may, for example, be a mixture of any suitable resin, e.g., acrylic resin, such as R-20 sold by Specialty Coatings & Chemicals, Inc., of North Hollywood, Calif., and molybdenum disulfide. In one embodiment the liquid composition to be sprayed is made by mixing 5 to 10 milliliters resin, 40 milliliters resin thinner, and 8.5 grams of molybdenum disulfide. Of course, it will be appreciated that numerous other resin and semiconductor material compositions may be used without departing from the spirit of the present invention. Specifically, materials such as sponge iron powder and iron oxide, tungsten carbide powder, tin oxide powder, boron powder or any other semiconductor material may be used, although molybdenum disulfide is preferred because of its low-noise lubricating characteristics.

The resultant cover 19 is glued or otherwise mechanically affixed to at least portions of the top of the insulative spacer 18 so that the pressure sensitive resistive layer 22 is in a normally spaced relationship (i.e., the switch is normally open) relative to the contact conductors 13. The glued or fixed cover is arranged to permit leakage of air; otherwise, an air passageway must be provided as referred to in other embodiments hereinafter.

Figure 3:
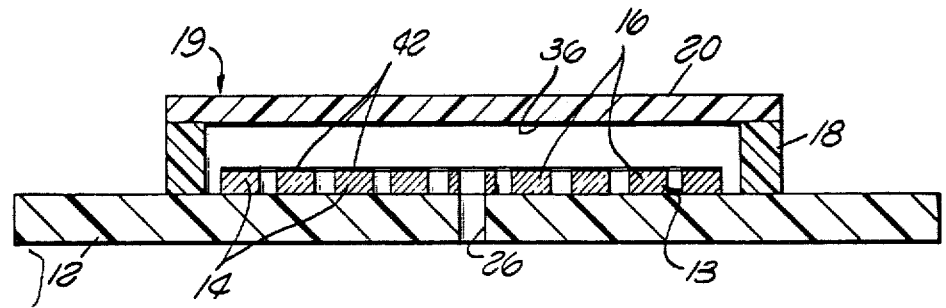
FIG. 3 is a cross-sectional plan view of an alternative embodiment of a pressure responsive analog switch with the thin resistive coating on the conductors.

Referring to FIG. 3, in an alternative embodiment of the invention, the pressure sensitive resistive layer 42 is disposed immediately on top of the contact conductors 13 and a conductor layer 36, such as a very thin layer of silver, is disposed on the surface of the support member facing the resistive layer 42 on the contact conductors 13.

Of course other arrangements of the present invention are possible so long as a pressure sensitive semiconductor composition layer is positioned between the contact conductors 13 and the cover 19 so that when the cover 19 is depressed into a contacting relationship with the contact conductors 13, the pressure sensitive resistive composition layer 22, 42 or 62 (FIGS. 2, 3 or 1) will be in series between a first contact conductor and a second contact conductor. By exerting more or less pressure to the resistive composition layer, more or less surface contact is made causing increased resistance between the adjacent conductors.

Referring again to FIG. 2 as well as FIG. 3, when the support member 20 is depressed, air trapped in the enclosure 24 will be compressed and can be exhausted through, for example, the junction between the cover 19 and the insulative spacer 18 or between the insulative spacer 18 and the base member 12. When the pressure is then removed from the cover 19, the resilient forces of the support member 20 will be insufficient to overcome the partial vacuum thus created in the enclosure 24, causing the cover 19 to remain in a depressed or closed state. This prevents the switch 10 from returning to a normally open state. In order to avoid this vacuum problem, a passageway in the form of an orifice 26 extending through the base member 12 allows air to flow into and out of the enclosure 24 when the cover is released or depressed. Of course it will be appreciated that any other suitable pressure release mechanism may be incorporated and for example the orifice 26 may be positioned through the cover 19 or through the insulative spacer 18. However, in the preferred embodiment the passageway will be the orifice 26 in the base member 12.

Figure 4:
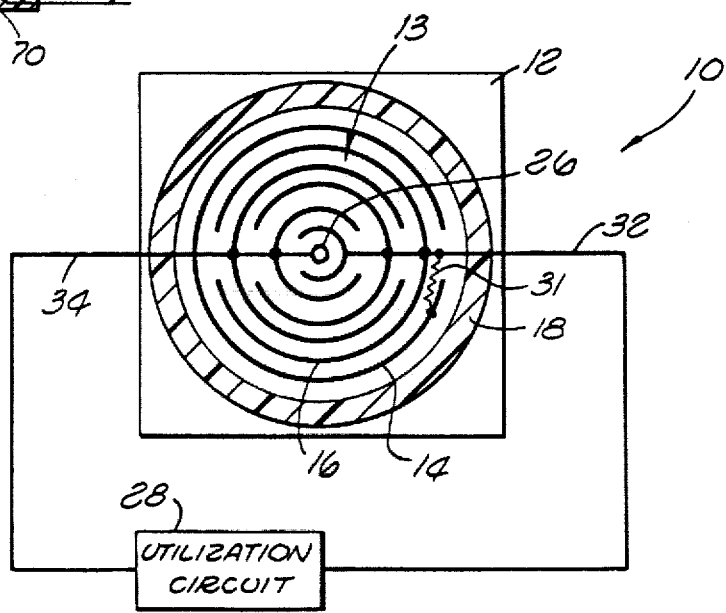
FIG. 4 is a schematic representation of a pressure responsive analog switch with the cover removed shown interconnected to a utilization circuit.

Referring now to FIG. 4, a conductor pattern which may be used in accordance with the present invention is illustrated schematically. Specifically, a pressure responsive variable contact resistance analog switch is shown with the cover removed to illustrate the contact conductor patterns 14 and 16 and their interconnection to a utilization circuit 28. Specifically, a first lead 32 is interconnected to one input of a utilization circuit 28 and terminates in a multiple diameter, opened ring, first conductor pattern 16. A second lead 34 is coupled between a second terminal of the utilization circuit 28 and a second contact conductor pattern 14 also comprised of a plurality of opened circular conductors of varying diameters. The circular portions of the first and second conductors 16 and 14 respectively are interleaved between one another in spaced-apart relationship and are disposed on a base member 12 with the insulative spacer such as an insulative ring 18, disposed around the periphery of the contact conductors 13. Thus, by depressing the cover 19 an electrical path will be provided through a resistance 31 provided by the semiconductor composition layer between the first conductor 16 and the second conductor 14.

The range of resistance values which may be inserted between conductors 32 and 34 by applying pressure may be increased by increasing the spacing between the interleaved conductors 16 and 14.

Figure 5:
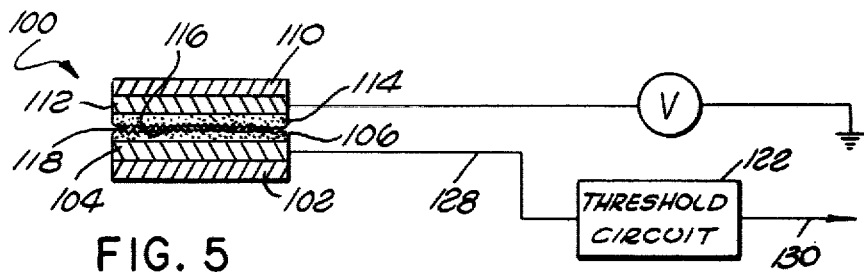
FIG. 5 is a cross-sectional side view of a bounceless switch apparatus.

Referring now to FIG. 5, another embodiment of the invention is illustrated for providing a bounceless switch apparatus having a surface contact resistance which varies inversely with a pressure applied normally thereto. Specifically, a bounceless switch apparatus 100 has a first support member 102 which may be made out of Mylar, a rigid plastic material, or any other suitable nonconductive base material. A first conductor 104 is disposed on the surface of the support member 102 with a first pressure sensitive composition layer 106 disposed thereon to cover and be in intimate contact with the conductor member 104.

Juxtaposed normally opposite to the first pressure sensitive composition layer 106 is an assembly comprising a support member 110, which may be Mylar, rigid plastic, or any other suitable nonconductive material, a conductor member 112 disposed on one surface of the support member 110, and a second pressure sensitive composition layer 114 disposed to cover and be in intimate electrically conducting relationship with the conductor 112. The assembly comprising the second support 110, the second conductor member 112, and the second pressure sensitive composition layer 114 is positioned in facing relationship with the assembly comprising the first member 102 to the first conductor member 104 and the first pressure sensitive composition layer 106 so that the exposed surface 108 of the first pressure sensitive composition layer 106 is in nonintimate but touching relationship with the exposed surface 116 of the second pressure sensitive composition layer 114 to thereby define a nonintimate contact junction 118.

As previously indicated, the first and second pressure sensitive composition layers are made out of a particulated semiconducting material having particle sizes which are preferably on the order of one to ten microns, although larger sizes are possible. The particulated semiconducting material is then mixed with a binder material and, if necessary, a binder thinner, and then is sprayed, silk-screened or otherwise disposed on the conductors 104 and 112 respectively. Each resulting pressure-sensitive composition layer 106 and 114 thus has a number of particles which extend outwardly from the mean surface plane of the respective pressure sensitive composition layers 106 and 114 to form micro protrusions of particulate semiconducting material. It is these microprotrusions which allow the first and second pressure sensitive composition layers to touch without being in intimate electrically conducting relationship. However, when pressure is applied compressing the two surfaces together, the microprotrusions on the respective pressure sensitive composition layers are depressed toward one another forming more and more electrical contact points, thus decreasing the resistance across the junction 118. However, because there is already a small number of electrically contacting touching points (although these are extremely few resulting in a very high resistance when the respective pressure sensitive composition layers are not being depressed against one another), the chatter which results when mechanical contacts are brought into contact with one another in conventional switches is virtually eliminated. Furthermore, any chatter which might be generated occurs only when the resistance across the junction 118 is extremely high thus making the voltage drop across the junction 118 likewise very high thereby making the voltage excursions or variation very small.

Figure 6:
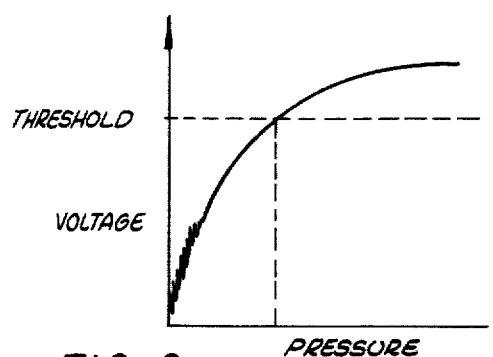
FIG. 6 is a pressure versus voltage curve illustrating the variations in voltage across the semiconducting composition layers as the compression forcing those two layers together is increased.
Figure 7:
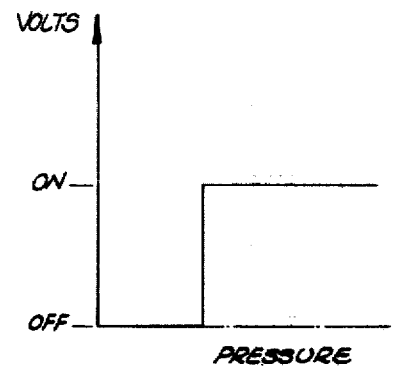
FIG. 7 is a curve illustrating the output of the bounceless switch in accordance with the invention shown in FIG. 5.

In operation the pressure is applied to compress the respective pressure sensitive composition layers towards one another so that the resistance across the junction 118 decreases as the number of contact points between the microprotrusions of the particulate semiconducting material increases thus causing the voltage drop across the junction to decrease. This, in turn, results in an increase in the output voltage as illustrated by FIG. 6 which illustrates severally the increasing voltage on a lead 128 coupling the conductor 104 to a threshold or utilization circuit 122. By coupling this voltage to the threshold circuit 122, a clean bounceless and chatter-free transition from the OFF to the ON state at the output of 130 of the threshold circuit 122 can be achieved as generally illustrated in FIG. 7.

Of course it will be appreciated that a threshold circuit such as the threshold circuit 122 is a well-known conventional circuit and indeed such a circuit is not necessary in accordance with the invention in many types of circuits, particularly those using CMOS-type circuitry wherein inherent thresholding occurs in the circuit components used to perform other functions.

Figure 8:
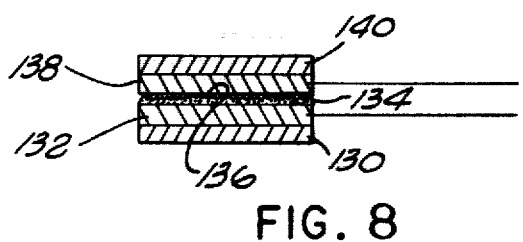
FIG. 8 is an illustrated embodiment of the bounceless switch apparatus in accordance with the invention having only one semiconducting composition layer.

Referring now to FIG. 8, an alternative embodiment of the invention is shown in which only one of the conductors has a pressure sensitive composition layer disposed thereon. Specifically, a conductor member 132 is disposed on the top of an insulative support member 130 with a pressure-sensitive composition layer 134 disposed to cover the conductor 132 and be in initimate electrically conducting relationship therewith. A second conductor member 138 is similarly disposed on a second support member 140. The second conductor 138 is then positioned in nonintimate but touching relationship with the exposed surface 136 of the pressure sensitive composition layer 134. In a manner similar to that previously described, the minute microprotrusions of semiconducting material allow the conductor 138 to be in touching but nonintimate and virtually nonconducting relationship with the semiconducting layer 132 thus resulting in an extremely high junction resistance between the conductor 138 and the pressure sensitive composition layer surface 136.

Although various particulate sizes and layer thicknesses are possible in accordance with the invention, it has been found that there is an inverse relationship between the amount of electrical chatter caused by closing or opening the switch contacts and the size of the molybdenum disulfide particles. Thus, the finer the grain size of the molybdenum disulfide, the smoother the transition from the OFF to the ON state (or vice-versa) of the switch will be. Specifically, it has been found that particle sizes less than one micron and preferably about 0.7 microns provide a substantially chatter-free switch transition.

While this second embodiment works generally the same as the prior embodiment, in the preferred embodiment both conductors are covered with the semiconducting particulated material to insure greater sensitivity.

While particular embodiments of the invention have been shown and described, it will be obvious to those skilled in the art that changes and modifications may be made without departing from the invention in its broader aspects, and therefore the aim in the appended claims is to cover all such changes and modifications as followed in the true spirit and scope of the invention.

What is claimed:

1. A bounceless switch apparatus having a junction resistance which varies inversely with a pressure applied normally thereto, comprising:

a first conductor member;

a pressure sensitive composition layer including a particulated semiconducting material disposed for covering the first conductor member in intimate electrically conducting contact therewith, the layer pressure sensitive composition layer having a first surface with a multiplicity of microprotrusions of the particulate semiconducting material extending from the first surface for providing a multiplicity of surface contact locations; and a second conductor member positioned in substantially nonelectrically conducting relationship to the pressure sensitive composition layer whereby the bounceless switch apparatus is normally open, the switch being closed in response to a pressing force applied to urge the second conductor member and the first surface together for increasing the physical contact between the microprotrusions and the second conductor, to enable electrical conduction through the contacting microprotrusions, the amount of electrical conduction increasing as the amount of pressing force is increased and decreasing as the amount of pressing force is decreased.

2. A bounceless switch apparatus having a surface contact resistance which varies inversely with a pressure applied normally thereto comprising:

a first conductor member;

a first pressure sensitive composition layer including a particulated semiconducting material disposed for covering the first conductor member in intimate electrically conducting contact therewith and further having a first surface having a multiplicity of microprotrusions extending therefrom;

a second conductor member; and a second pressure sensitive composition layer including the particulated semiconducting material disposed for covering the second conductor in intimate, electrically conducting contact therewith and further having a second surface having a multiplicity of microprotrusions extending therefrom, the first and second surfaces being positioned in normally electrically nonconducting relationship with each other, at least one of the first and second conductor members being resiliently movable in response to a pressing force applied thereagainst so that the multiplicity of microprotrusions extending from the first and second pressure sensitive composition layers are urged against one another to enable electrical conduction between the first and second conductor members, the amount of electrical conduction increasing as the pressing force is increased and decreasing as the amount of pressing force is decreased.

3. The bounceless switch of claim 1 wherein the first pressure sensitive composition layer is less than about 0.001 inch thick.

4. The bounceless switch apparatus of claim 2 wherein the first and second pressure sensitive composition layers are less than about 0.001 inch thick.

5. The bounceless switch of claims 1 or 2 wherein the particulated semiconducting material is particulated molybdenum disulfide.

6. The bounceless switch of claim 5 wherein the particle size of the particulated molybdenum disulfide is less than one micron.

* * * * *